(12) United States Patent
Schade-Buensow et al.

(10) Patent No.: US 7,561,495 B2
(45) Date of Patent: Jul. 14, 2009

(54) METHOD FOR RECORDING INFORMATION, IN PARTICULAR AUDIO SIGNALS, RECEIVED VIA RADIO, IN PARTICULAR BROADCAST RADIO

(75) Inventors: Volker Schade-Buensow, Hildesheim (DE); Darren Zimmer, Nordstemmen (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 10/453,443

(22) Filed: Jun. 2, 2003

(65) Prior Publication Data

US 2004/0032805 A1    Feb. 19, 2004

(30) Foreign Application Priority Data

Jun. 7, 2002    (DE) ................................ 102 25 624

(51) Int. Cl.
*H04H 60/17* (2008.01)
(52) U.S. Cl. ............................................... 369/7; 369/6
(58) Field of Classification Search ....................... None
See application file for complete search history.

(56) References Cited

U.S. PATENT DOCUMENTS

| | | | | |
|---|---|---|---|---|
| 4,982,390 A | * | 1/1991 | Tanaka | 369/83 |
| 5,418,762 A | * | 5/1995 | Kitayama | 369/13.02 |
| 5,598,391 A | * | 1/1997 | Mukawa | 369/53.37 |
| 6,163,508 A | * | 12/2000 | Kim et al. | 369/7 |
| 6,363,440 B1 | * | 3/2002 | Stepp et al. | 710/52 |
| 2002/0174430 A1 | * | 11/2002 | Ellis et al. | 725/46 |

* cited by examiner

*Primary Examiner*—Joseph Feild
*Assistant Examiner*—Tawfik Goma
(74) *Attorney, Agent, or Firm*—Kenyon & Kenyon LLP

(57) ABSTRACT

A method for storing information, in particular audio signals, received via radio, in particular broadcast radio, the received information being written to a first memory, where the information stored in the first memory is overwritten by newly received information, preferably no later than when the memory capacity of the first memory is exceeded by the sum of the information stored in the first memory, and where in response to a record command all or part of the information present in the first memory is transferred into a second memory. As a result, even when playback of information which is of interest to the user has already begun, the latter can nevertheless record the entire information unit, for example the whole piece of music, part of which has already been played back, in its entirety right from the beginning.

11 Claims, 2 Drawing Sheets

METHOD FOR RECORDING INFORMATION, IN PARTICULAR AUDIO SIGNALS, RECEIVED VIA RADIO, IN PARTICULAR BROADCAST RADIO

BACKGROUND INFORMATION

Broadcast radio receivers in the form of car radios having a traffic message recording function are known, in which audio signals received via broadcast radio, here in the form of spoken traffic messages, are stored in an audio signal memory of the device in response to a traffic message identifier that accompanies the traffic reports and is also broadcast by radio. When its capacity is exceeded as a result of newly received traffic messages, the memory of the device is regularly overwritten by the latest messages. The currently stored traffic messages can be recalled when desired by the user and reproduced acoustically.

Particularly from the field of home entertainment electronics, recording devices are known by which (audio) signals received via broadcast, for example radio or television broadcast, can be recorded from the current program.

SUMMARY OF THE INVENTION

The method according to the present invention has the advantage over the related art that even when the playback of an audio signal which interests the user or the transmission of information has already begun, the user can nevertheless completely record the entire audio signal unit or information unit, for example, the complete piece of music which has already been partially played back.

For this purpose, according to the present invention, there is a buffer memory (also referred to below as the first memory), into which all information received, in particular audio signals, is regularly written; when the recording capacity of the buffer memory is exceeded, its content is overwritten by newly received information, beginning with the oldest stored signals. The memory capacity of the buffer memory is advantageously designed so that it is possible to record at least a segment of a received signal, in particular an audio signal, in particular a music signal, to enable the user to judge whether the audio signals just received and played back are of articular interest to him/her and hence worth storing. According to the present invention, at a record command the content of the buffer memory is transferred into a memory (referred to below as the second memory) and thus stored for later playback.

According to an advantageous refinement of the present invention, the information signals of the same information unit which are received by radio following the recorded information, in particular audio signals, in particular of the same piece of music, are saved to the second memory, preferably at memory locations following the first segment of information. Thus a complete information unit, in particular an audio signal unit, in particular a complete piece of music, is available in the second memory to be recalled for subsequent repeated playback.

In an advantageous embodiment of a radio receiver for carrying out the method, for short-term temporary storage of the information signal received by radio, in particular an audio signal, the receiver uses a buffer, which is needed for error correction in conjunction with a playback device for disk-shaped recording media (CD, DVD, . . . ) that is integrated into the radio receiver. A buffer of this type (shock proof memory) typically has sufficient recording capacity for buffering the information signal received by radio, in particular an audio signal, according to the present invention. Moreover, the buffer is not needed for disk playback (CD, DVD, . . . ) in radio playback mode, in particular broadcast radio playback mode, and can thus be co-utilized advantageously for other purposes.

DETAILED DESCRIPTION

Figure 1:
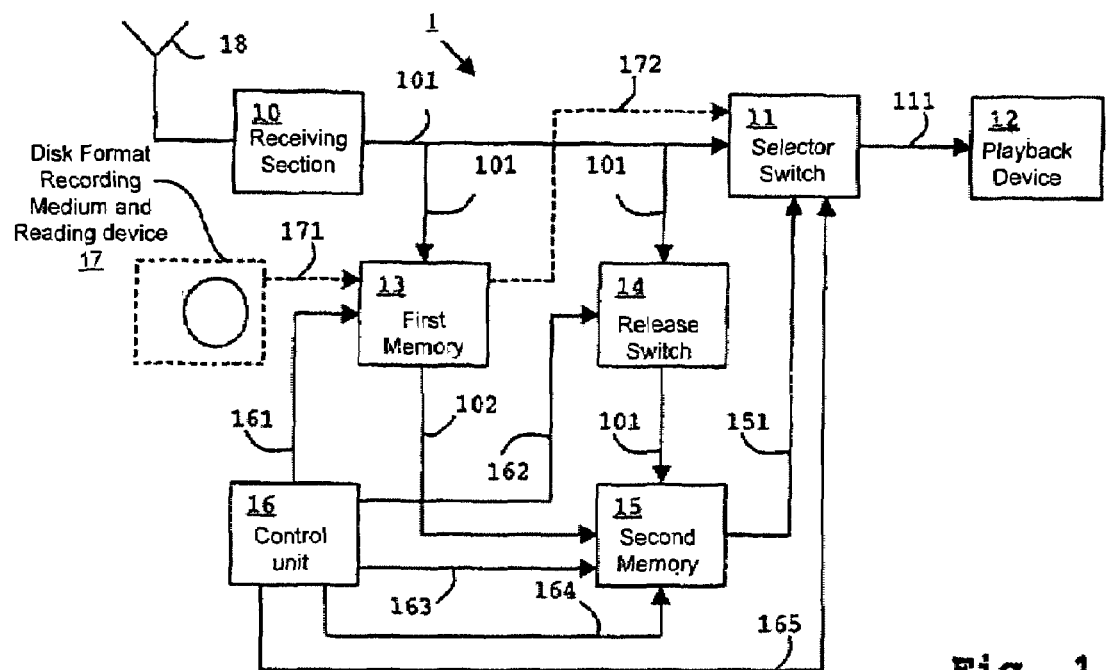
FIG. 1 shows a schematic diagram of the part of a car radio important to the present invention, as an example of a system for carrying out the method according to the present invention.

FIG. 1 shows a schematic diagram of a radio receiver I for carrying out the method of the present invention, using the example of a car radio that is designed to receive frequency modulated radio signals in the VHF frequency band. The modulation content of these VHF broadcast signals regularly includes radio program signals intended for acoustic playback, i.e. audio signals, including pieces of music.

A mixture of VHF reception signals receivable at the receiving location, that are present at a receiving antenna 18, is conducted to a receiving section 10 of the car radio. In a manner already known and therefore not explained in greater detail here, receiving section 10 has the circuitry for selecting and demodulating a particular one of the receivable VHF reception signals. Accordingly, modulation content 101 of the selected and demodulated VHF reception signal, i.e. the actual radio program, is present at the output of receiving section 10.

Continuously received radio program 101 is recorded in a first memory (also buffer memory) 13 in a radio playback mode described below. First memory 13 preferably has limited storage capacity, so that it can store an audio signal segment of 30 seconds in length, for example. In addition, first memory 13 is designed so that in the event that its storage capacity is completely exhausted by stored audio signals, the oldest of the recorded signals are overwritten by newly received audio signals.

Consequently, at any given moment of observation the audio signals received in the last 30 seconds are stored in first memory 13.

According to a particularly advantageous embodiment of the present invention, in a broadcast playback mode in which the received radio program is played back through speakers connected to the car radio, a "shock proof memory" is used as first memory 13. The "shock proof memory" is a buffer memory for temporary storage of audio signals read from an audio signal medium in disk format, for example a compact disk (CD) or digital versatile disk (DVD) or the like. Such a recorded data medium in disk format and the associated reading device is widely used in present day car radios, and is marked with the reference symbol 17 in FIG. 1. As is generally known, disk reading devices are sensitive to shock; as a result of shocks to the reading devices, errors occur in reading the disk media, which result in audibly deficient audio signals. For that reason, an earlier patent application which is commonly assigned provided that audio signals 171 be read out at a higher speed than required for playback, and that the resulting data surplus be buffered for the purpose of error correction. The storage capacity of the "shock proof memory" used for that purpose is normally in the range of some tens of seconds, for example 30 seconds.

In a broadcast playback mode, continuously received radio program 101 is played back through a source selector switch 11 as playback signal 111 through a playback device 12. For this purpose, in a manner already known and therefore not explained in greater detail here, playback device 12 has the necessary means for volume adjustment and amplification and for influencing the sound of playback signal 111 if appropriate, as well as attached speakers for converting playback signal 111 to a sound event. Source selector switch 11 is switched among various playback modes by a control unit 16 of the car radio that includes control elements, using a source selection signal 165. In the present case, for example, provision is made for CD or DVD playback (corrected CD or DVD audio signal 172, if appropriate), broadcast playback mode (radio program signal 101), or playback of audio signals 151 recorded in a second memory 15, for example a multi-media card (MMC).

Depending on the desired playback mode, source selector switch 11 routes one of the forenamed audio signals, radio 101, MMC 151 or CD 172, as directed by source selector signal 165, to the input of playback device 12 as playback signal 111 for playback.

The above-described radio receiver also has a recording function, described in greater detail below, for recording audio signals received via radio on another recording medium, for example an MMC, which is represented in the figure by second memory 15.

Figure 2:
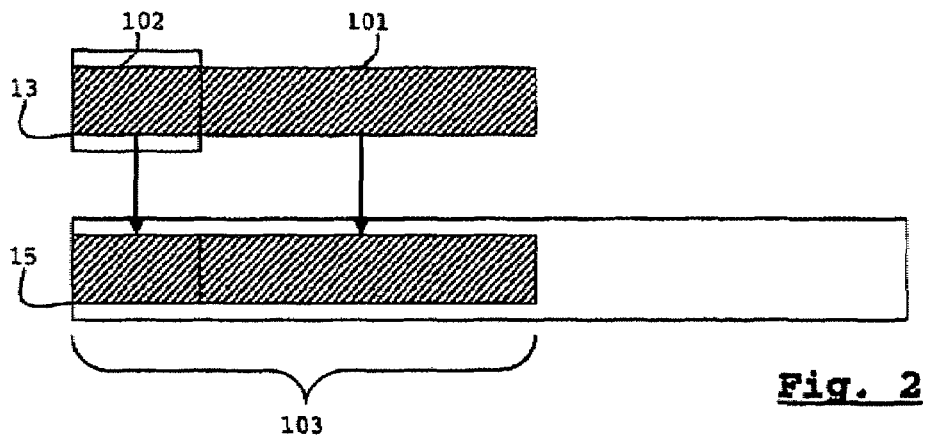
FIG. 2 shows a schematic depiction of the process of recording an audio signal received via radio.

Received audio signal (radio program signal) 101 is conducted for this purpose through a release switch 14 to second memory 15. Release switch 14 is actuated by control unit 16; after a record command is initiated by the user through control unit 16, a release signal 162 connects release switch 14 through to convey received audio signal 101 to second memory 15. In addition, a copy signal 161 initiated by the record command causes memory content 102 of first memory 13, i.e. the segment of audio signal 101 written to first memory 13, to be output to second memory 15. Finally, a transfer signal 163 to second memory 15, issued by the control unit in response to the record command, causes content 102 of first memory 13 to be transferred to second memory 15 and also currently received audio signal 101 to be recorded at memory locations in second memory 15 following the content transferred from the first memory. Consequently, content 102 of first memory 13 and immediately thereafter, currently received audio signal 101 is written first to second memory 15 (FIG. 2).

Figure 3:
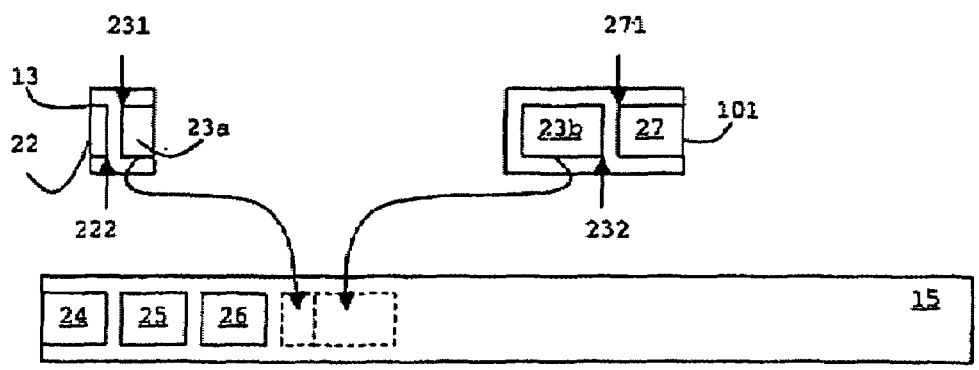
FIG. 3 shows a detailed schematic depiction of the process of recording an audio signal received via radio.

A detailed illustration of the recording process is given in FIG. 3, using the example of recording pieces of music from a continuously received broadcast program. In the case of the embodiment on which FIG. 3 is based, the radio receiver is one for receiving broadcast signals transmitted according to a digital standard, such as "XM" or "SIRIUS." Along with the actual radio program (music, spoken comments), additional information is transmitted, including for example, in the case of a piece of music 23 that is just being transmitted, the name of the artist or interpreter, the title of piece 23, and beginning and end markers for piece 23 that is just being transmitted.

The currently received audio signals are written into first memory 13, that is, the above-described buffer memory, in such a way that the oldest audio signals present in the memory are always overwritten by audio or music signals just received.

At an observation moment captured in FIG. 3, there are in memory 13 still audio signals of an older piece of music 22, as well as its end marker 222, which was also recorded. Subsequently, additional audio data 23a of music piece 23 just received, as well as its beginning marker 231, are stored in memory 13. Audio data 23a represent audio signals 101 of currently receivable music piece 23, already broadcast at the moment of observation and received by radio broadcast receiver 1.

Now if a record command is initiated at the moment depicted in FIG. 3, for example by operation of a corresponding control element on control 16 by the user, the content of first memory 13, beginning with beginning marker 231 of currently receivable music piece 23, i.e. the already received and buffered audio signal segment 23a of piece 23, is copied to a free memory location in second memory 15. The first free memory location in memory 15 follows music pieces 24, 25 and 26, which are already stored there in the same manner. The record command also causes segment 23b of currently received music piece 23, which is still to be received, to be written directly into second memory 15 from continuously received radio program signal 101 (=audio signal). Here second segment 23b of music piece 23 is written immediately following first audio signal segment 23a of music piece 23, which was first buffered in first memory 13 and then copied to the second memory. The recording of second audio signal segment 23b from the ongoing program is terminated upon recognition of end marker 232, which is received along with the audio signal. A subsequently received additional signal 27, identified by the beginning marker 271, is then written again to first memory 13 in the described manner.

If the receivable broadcast signal transmits no end marker for audio signal units, but instead only a beginning marker, a total length of the piece of music and/or a display of progress, the end of the writing to second memory 15 may be determined from the current program on the basis of the beginning marker and the total length of the piece, or alternatively or additionally on the basis of the total running time of the piece and of the progress display, by comparison with an internal clock within the device.

If no data directly or indirectly indicating the end of the piece of music are transmitted or received, this may be determined by recognition of a signal pause, for example through zero level detection, and the recording process may be terminated upon recognition of the signal pause.

Even if the user initiates a record command at control unit 16 only after playback of an audio signal received via radio has begun, in particular for example a piece of music, the described recording process nevertheless causes the entire audio signal unit 103, in particular the entire music piece 23, to be recorded in second memory 15, including its beginning, which preceded the triggering command in time.

However, that requires the record command to be given at control unit 16 by the user within the recording period after the beginning of the audio signal received by radio specified by the capacity of first memory 13. A recording capacity of first memory 13 of about 30 seconds appears to be adequate.

According to a refinement of the present invention, a means of blocking the recording may be provided for cases where the record command is not given within the period after the beginning of the audio signal specified by the recording capacity of first memory 13. Consequently, audio signal units whose beginning is no longer available due to the limited capacity of first memory 13 are not recordable in second memory 15.

As described, the beginning of an audio signal unit, in particular a piece of music, may be recognized for example by zero level detection, i.e. by testing the received audio signals for segments in which the level of the signal drops below a specified value for a prescribed length of time. Suitable values for the specified value of the audio signal level may preferably be determined empirically and as a function of background noise or a measure of reception disturbances. That ensures reliable recognition of pauses, even with poor or noisy received audio signals. The specified time period after which a zero level is recognized as a pause in the audio signal may also be determined empirically, for example as a function of the dynamics of the received audio signal.

The described zero level detection for recognizing the beginning may also be used for limiting the signal copied from first memory 13 into second memory 15 at the record command. That makes it possible to prevent portions of the signal that occur earlier than the beginning of the audio signal unit (music piece), which have not yet been overwritten in first memory 13, from being copied into second memory 15 as signal components supposedly belonging to the beginning of the current audio signal unit.

It is possible for example in the case of a receiver for digital radio broadcast signals to also transmit beginning and/or end markers for audio signal units by radio. These may then be utilized advantageously instead of the described zero level detection to recognize the beginning of an audio signal unit 103 which has been recorded or is to be recorded. For example, in the "XM" satellite broadcast system operated in the U.S., as mentioned, alongside a music signal, the names of the artist and the piece of music are also transmitted periodically, as well as the length and progress, in time units, of the piece of music currently being transmitted, and furthermore the length and starting time of the piece that will follow next. The satellite broadcast system "SIRIUS," which is also operated in the U.S., is similar. The time data included in the transmission can be used in conjunction with a clock provided in receiver 1, to recognize the beginning of a piece of music or an audio signal unit.

By using an appropriate selection command via control unit 16, instead of a current radio transmission or a CD or DVD signal the audio signal stored in second memory 15 may be played back via source selector switch 11 and playback unit 12. To this end, control unit 16 generates a corresponding selection control command 164 to control second memory 15 to emit the stored audio signal, and a corresponding source selection command 165 to switch source selector switch 11 over to the output of second memory 15.

Second memory 15 may be advantageously implemented for example as a card read/write device for memory chip cards, in particular for example for an MMC (multi media card) with embedded storage medium (MMC).

Particularly advantageous is an implementation of second memory 15 in which the actual storage media are exchangeable, as in the case of the MMC. An alternative implementation of second memory 15 could be for example a read/write device for the essentially-known MiniDisc™ (MD), where the MiniDisc may be utilized as a replaceable storage medium. Alternatively, second memory 15 could be implemented for example in the form of a removable hard drive, or a miniature hard drive such as the Microdrive™.

Even though the described exemplary embodiment is directed substantially at a car radio for receiving FM-modulated radio broadcast signals transmitted in the VHF band, having integrated CD or DVD playback device, this is not intended to limit the object of the present invention in any way. Rather, the present invention is certainly applicable in principle to all radio receivers, whether for example to radio receivers for digital broadcasts such as DAB (digital audio broadcasting), satellite radio or the like. In the case of coded audio signals, in particular those transmitted in compressed form, for example according to MPEG-2, MPEG-3 or some other standard, these signals may also be written advantageously in compressed form to first and second memories 13, 15. This permits improved memory utilization, and consequently greater memory capacity, in the case of first memory 13 in particular a longer response time for the user to enter the record command after playback of the audio signal being received has begun. In this case, the decoding is advantageously integrated into playback unit 12, to which the audio signals that are present in coded form are supplied for the purpose of playback.

An additional exemplary embodiment of the present invention will be explained next on the basis of FIGS. 4 and 5.

This embodiment is also based on the radio or broadcast receiver as described above in particular in reference to FIG. 1, but also the additional FIGS. 2 and 3. A significant difference between this embodiment and the radio receiver named above is in the recording capacity of first memory 13, which is preferably designed in the present case so that a number of pieces of music of average length (for example 3.5 minutes), for example five pieces, may be stored in first memory 13. First memory 13 may also be implemented here as a separate memory component, such as flash memory, but it is also possible to reserve a memory segment in second memory 15 to implement first memory 13 and buffer the most recently received audio signals. As with the exemplary embodiment described earlier, the current content of first memory 13, in which the audio signals received most recently via radio are stored, is also overwritten by currently receivable audio signals when its capacity limit is exceeded, so that at any given moment of observation audio signals 21, 22, 23a received immediately before that moment are always present in first memory 13 (FIG. 5). According to FIG. 5, together with buffered audio signals 21, 22, 23a, corresponding beginning and end markings 211, 231 and 212, if already received, are also stored.

Figure 4:
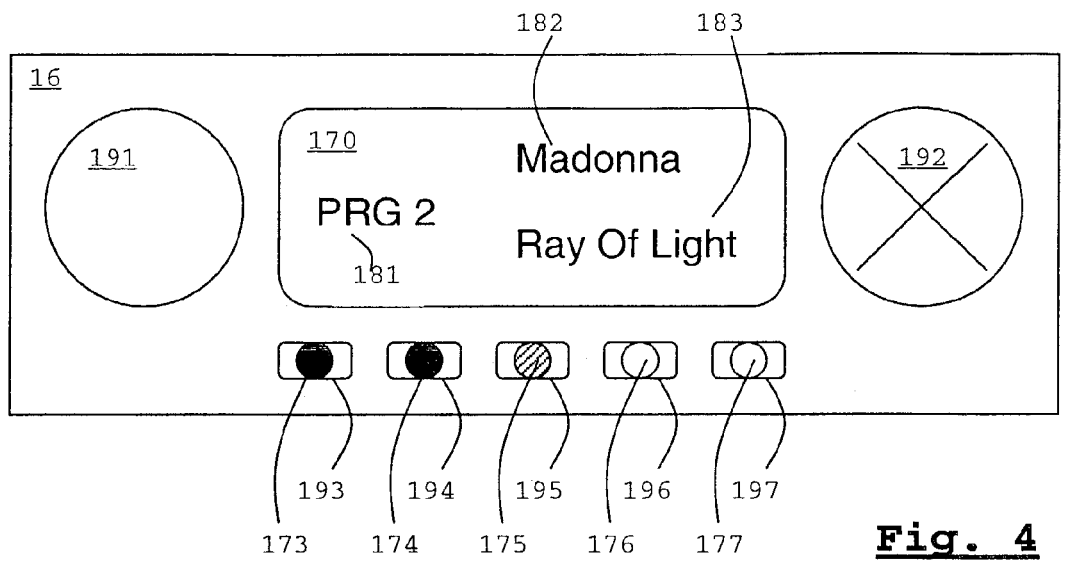
FIG. 4 shows the view of a front cover of a car radio for carrying out the method according to the present invention.

FIG. 4 shows the front cover of a car radio 1 according to the present invention which, in the installed state in a motor vehicle, is accessible to the user; at the same time its control unit 16 is shown. The latter includes a display unit 170 on which a variety of information is or may be displayed, such as the name 181 of a radio program currently being received, the name 183 of a piece of music 23 current being received, and the name 182 of the artist or interpreter of the piece of music currently being received. The front cover of car radio 1 also includes control elements, such as a rotatable incrementer 191 for adjusting a selectable parameter, for example the playback volume, or for selecting one of a plurality of radio programs receivable at the reception location, and a four-way rocker switch 192 for maneuvering in a two-dimensional selection menu depictable on display 170 or for selecting a parameter to be set by the incrementer 191.

The front cover also includes station buttons 193, 194, 195, 196 and 197, on which radio program data are normally stored in conventional car radios for optional selection of a particular radio program. These station buttons 193 through 197 are used in connection with the present invention to select a piece of music 21, 22, 23 temporarily stored in first memory 13 and to enter a record command to record or transfer the particular piece 21, 22 or 23 from first memory 13 into second memory 15. Here the design also provides for each of the individual station buttons 193 through 197 to be assigned to a piece of music 21, 22, 23 etc. that is temporarily stored in first memory 13. The design provides for a maximum number of pieces of music to be stored at all times in first memory 13 corresponding to the number of station buttons 193 through 197 available on front cover 16 of car radio 1, so that each temporarily stored piece is clearly assignable to a station button.

Figure 5:
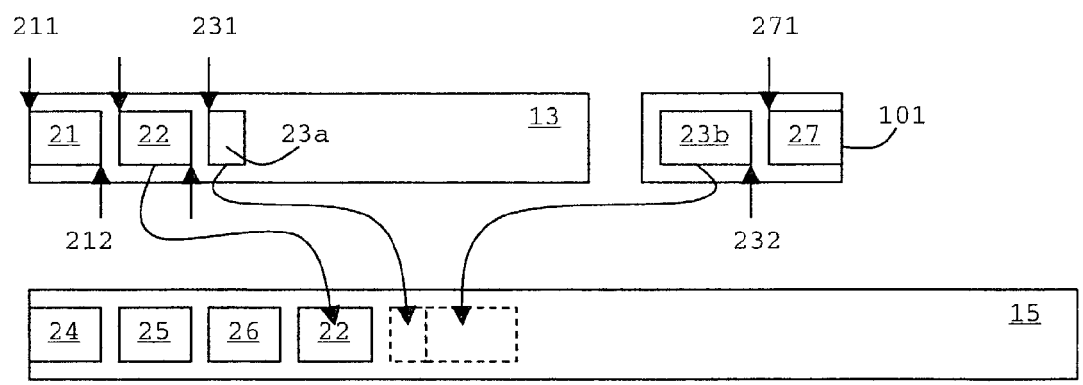
FIG. 5 shows a detailed schematic depiction of the process of recording an audio signal received via radio according to an alternative exemplary embodiment of the present invention.

In the case of FIGS. 4 and 5, at the moment of observation captured there, two music pieces 21 and 22 with their beginning and end markers 211 and 212 are already completely recorded in first memory 13. These are assigned to the first two station buttons 193 and 194. Also present in the first memory is a first segment 23a of a third piece of music 23, together with its beginning marker 231. Third music piece 23 is assigned to third station button 195.

According to a particularly advantageous implementation of this exemplary embodiment of the present invention, station buttons 193, 194, 195, 196 and 197 may be illuminated individually by individually assigned light sources 173, 174, 175, 176 and 177. The current illumination status of each station button 193 to 197 indicates the assigned memory content of first memory 13. In the case of FIGS. 4 and 5, two pieces of music 21 and 22 are present in their entirety in first memory 13.

Station buttons 193 and 194 assigned to these two pieces are illuminated by their assigned light sources 173 and 174, for example red. Also present in first memory 13 is a first segment 23a of a third piece 23, which is currently being written into first memory 13. Station button 195, assigned to third piece 23, is illuminated by assigned light source 175, for example flashing red. The different, in this case flashing, illumination of third station button 195 indicates that third music piece 23 is just being written into the first memory. Additional station buttons 196 and 197 are not illuminated, since no assigned music pieces are present in first memory 13.

Through activation of one of the illuminated station buttons, in the case of FIGS. 4 and 5 193 or 194, and the selection and record command which that triggers, assigned music piece 21 or 22 is copied from first memory 13 to the next free memory location in second memory 15. In the situation shown in FIG. 5, there are already music pieces 24, 25 and 26 stored in second memory 15. Upon actuation of second station button 196, the second music piece 22 present in first memory 13 is copied to the free memory address in the second memory that follows music piece 26.

However, if third flashing station button 195 is actuated, the recording process described earlier in connection with FIGS. 1 to 3 follows; that is, the first part 23a of first music piece 23, which is already present in the first memory, is copied to the second memory, while the second segment 23b of third music piece 23 from currently received broadcast program 101, which has not yet been recorded, is written directly into second memory 15 at the address immediately following first segment 23a.

The end of the recording of third music piece 23 may be triggered advantageously, as already indicated, by received end marker 232. Additional music pieces 27 (with beginning marker 271) contained in the broadcast signal are then also written to first memory 13 in the described manner.

The above exemplary embodiments were described primarily on the basis of audio signals or music pieces. This is not intended to be understood as a restriction to audio signals, however, but rather any other type of information may also be recorded in the same manner, for example, video information or information from data services, such as traffic messages transmitted in coded form for example.

What is claimed is:

1. A method for recording information, comprising:
storing a first received information in a first memory;
overwriting the first information stored in the first memory with newly received second information;
in response to a first record command:
  transferring at least a part of the second information stored in the first memory into a second memory; and
  storing a third information received subsequent to the first record command directly in the second memory, bypassing the first memory, wherein the first memory includes a buffer memory used by a playback device to correct errors in media recorded in a disk format and retrieved for playback, and wherein the second and third received information form a first audio signal unit;
receiving a second audio signal unit;
storing the second audio signal unit in the first memory, the second information and the second audio signal unit being simultaneously present in the first memory; and
assigning to the first audio signal unit a first one of a plurality of buttons and to the second audio signal unit a second one of the plurality of buttons;
wherein activation of the second button is interpreted as a second record command to transfer the second audio signal to the second memory, and activation of the first button is interpreted as the first record command.

2. The method of claim 1, further comprising:
illuminating for a first visual accentuation ones of the plurality of station buttons that are assigned to audio signal units that have been completely stored in the first memory.

3. The method of claim 2, further comprising:
illuminating for a second visual accentuation different than the first visual accentuation a station button that is assigned to an audio signal unit currently being written to the first memory.

4. The method of claim 3, wherein the illuminating for the first visual accentuation comprises illuminating with a steady light, and the illuminating for the second visual accentuation comprises illuminating with a blinking light.

5. The method according to claim 1, wherein the second and third information includes audio signals received via broadcast radio.

6. The method according to claim 1, wherein the first information is overwritten with the second information no later than when a memory capacity of the first memory is met by a sum of all information stored in the first memory.

7. The method according to claim 1, wherein the third information is of a same information unit as that of the second information and is stored in the second memory subsequent to the second information.

8. The method according to claim 7, wherein the same information unit is a same piece of music received via radio.

9. The method according to claim 7, wherein the third information is stored in the second memory at memory locations following the second information.

10. The method according to claim 1, wherein the playback device is for at least one of a CD and a DVD.

11. The method according to claim 1, wherein the playback device is integrated into a radio receiver.

* * * * *